June 2, 1970  K. G. CLARK ET AL  3,515,099

MECHANICAL FEEDERS FOR LIVESTOCK

Filed April 8, 1968  5 Sheets-Sheet 1

Inventors:
Kenneth Gould Clark
and
David Charles Kemp
BY Baldwin, Wight, Diller & Brown
attorneys

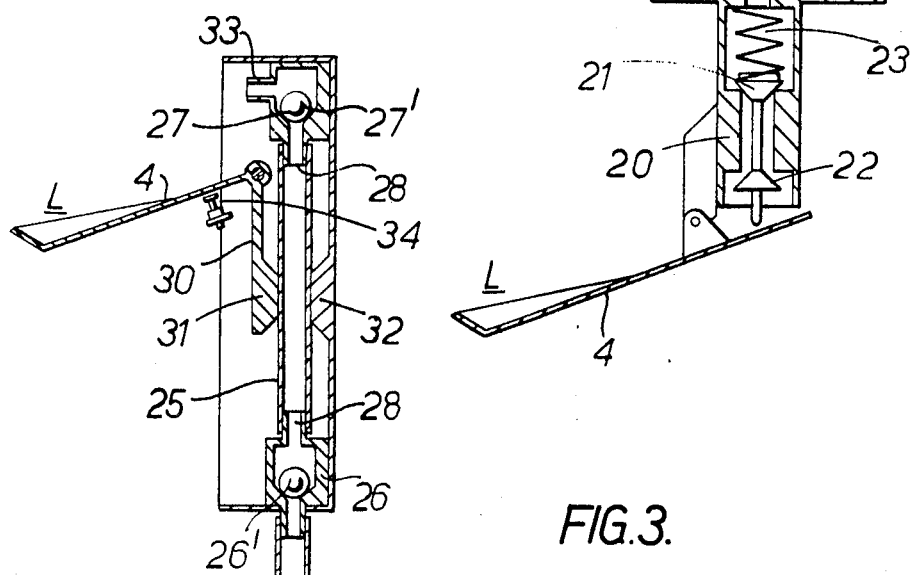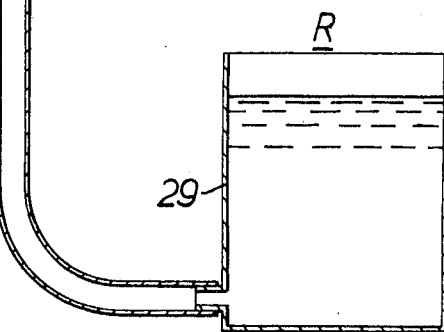

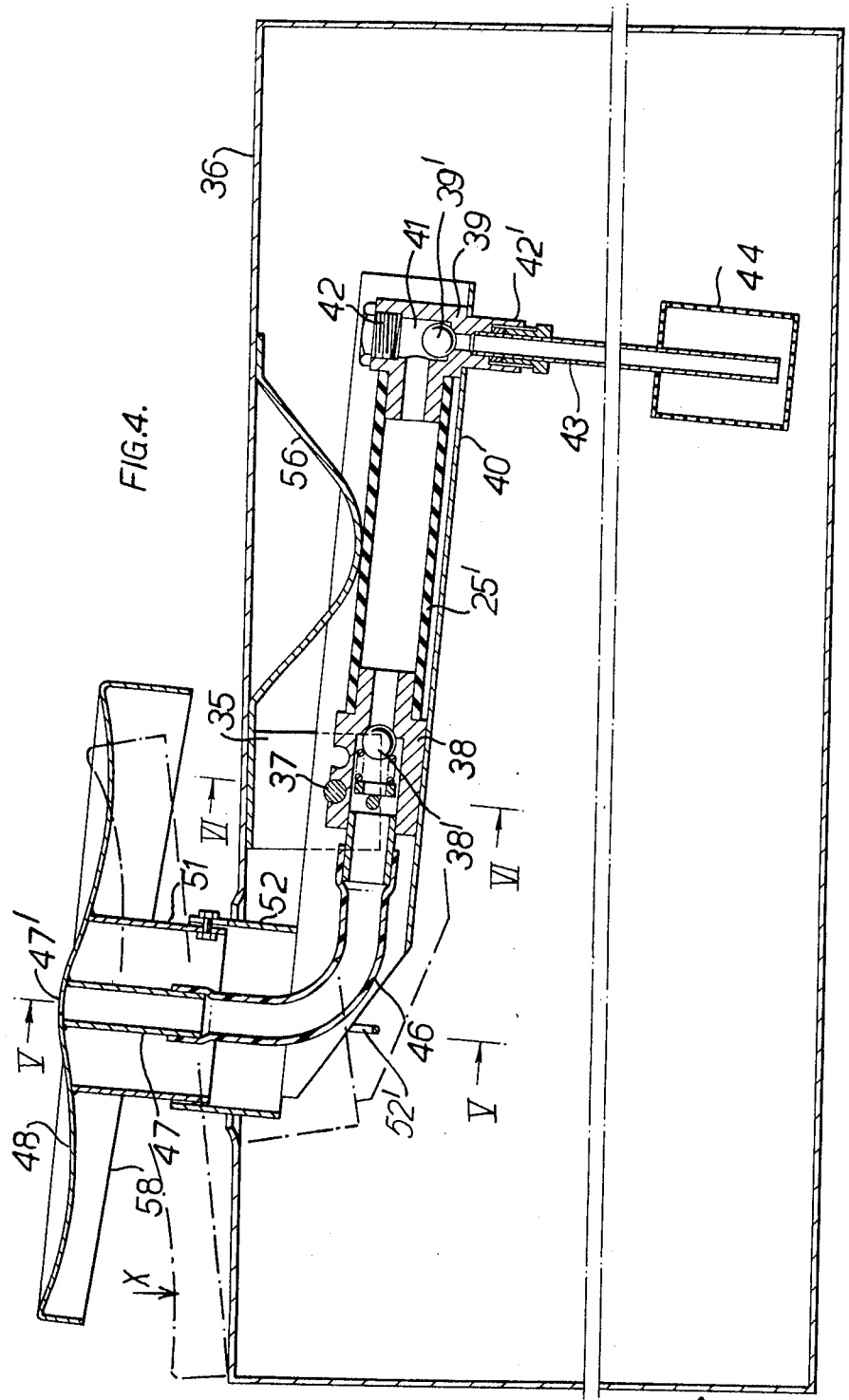

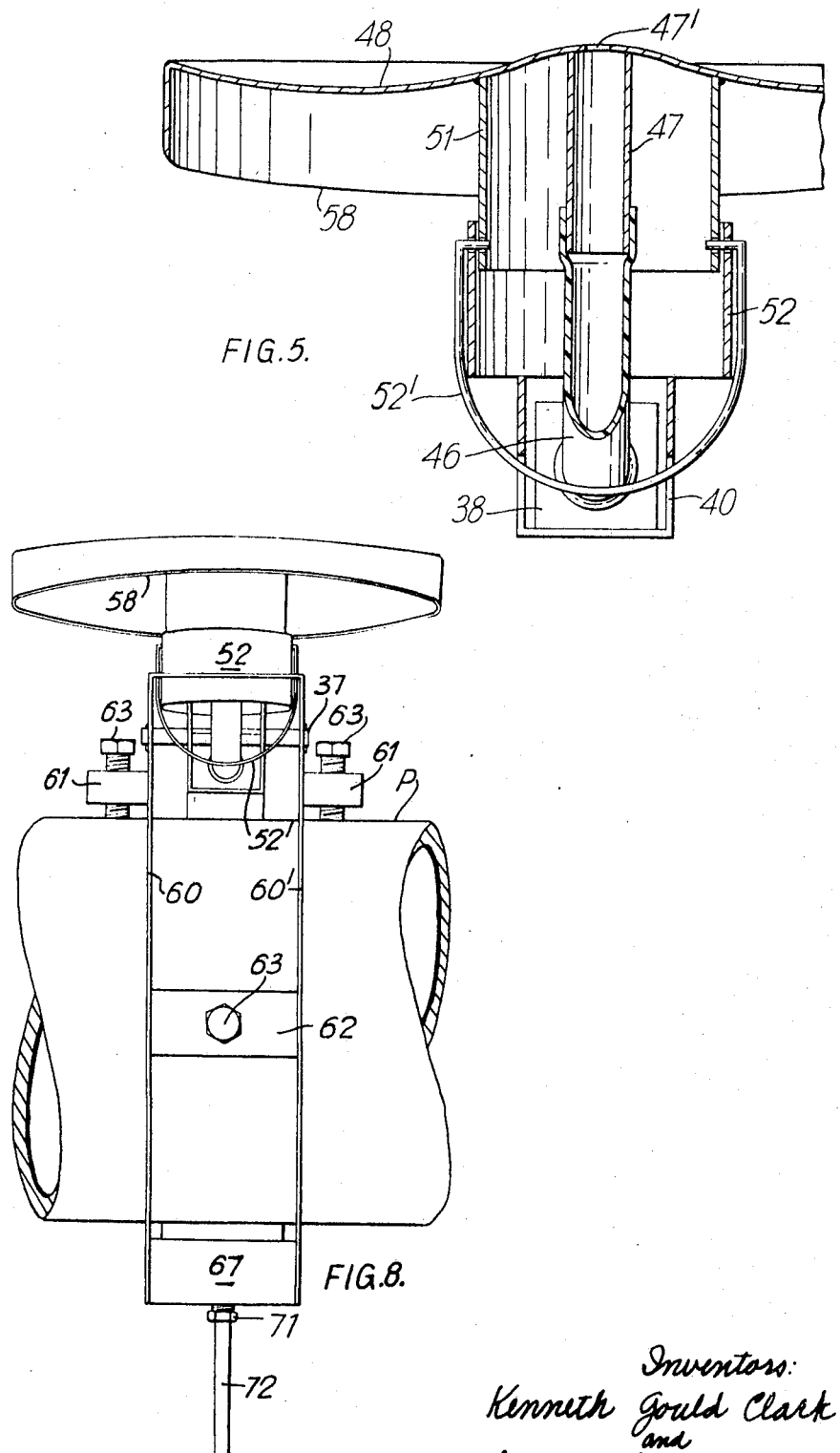

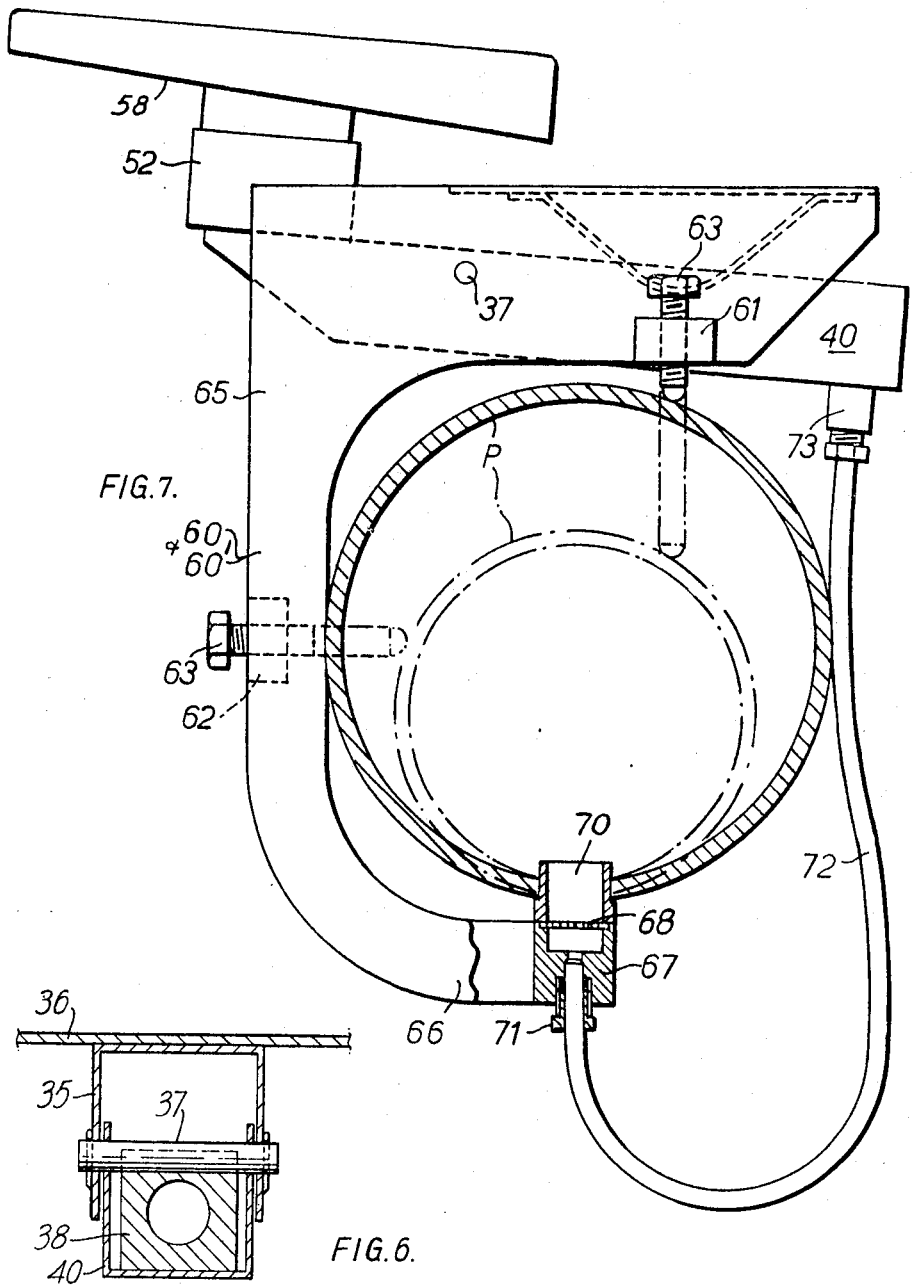

United States Patent Office 3,515,099
Patented June 2, 1970

3,515,099
MECHANICAL FEEDERS FOR LIVESTOCK

Kenneth Gould Clark, Box, and David Charles Kemp, Shefford, England, assignors to Feed Service (Livestock) Limited, Wiltshire, England, a corporation of the United Kingdom
Filed Apr. 8, 1968, Ser. No. 719,362
Claims priority, application Great Britain, Apr. 14, 1967, 17,264/67
Int. Cl. A01k 7/00
U.S. Cl. 119—75                                    13 Claims

ABSTRACT OF THE DISCLOSURE

A feeding and/or drinking appliance for livestock comprises a licking plate attached to a support bracket and having limited displacement when engaged by an animal, and a pump unit carried by the bracket, the pump inlet being adapted for connection to a source of supply of food stuff and the pump outlet being positioned to discharge material onto the licking plate for animal consumption. Means are provided interconnecting the licking plate and the pump so that on displacement of the plate the pump is actuated to discharge material onto the licking plate.

---

This invention relates to mechanical feeders for livestock, and has for its object to provide such a feeder as will enable livestock to obtain liquid feed in desired quantities without being able to drink the said liquid feed directly from the containers.

If livestock are able to drink liquid feed, then the quantity taken may easily be more than is good for the livestock; this is due to the fact that the concentration of the nutrient in the liquid is carefully calculated to provide a reasonable food supplement content for the livestock, so long as the liquid is only attainable by a licking process, as distinct from a drinking process.

According to the present invention, feeding and/or drinking appliances for livestock comprises means for connecting the appliance to a source of supply of material to be consumed; a licking plate on to which material is discharged for consumption by livestock in search of liquid feed or supplements, which licking plate is capable of limited displacement by livestock when taking such feed or supplements; a valve device which normally remains closed but is movable to an open position to permit or cause flow of material from the supply source and mechanism interconnecting the licking plate and the valve device whereby on displacement of the plate when in use by the animal, the valve device will be actuated to permit or cause the liquid feed or supplement to be discharged on to the licking plate.

In practice, as applied to a drinking fountain, the appliance comprises a reservoir from which water is drawn off through a pipeline to a valve housing or compartment incorporating a valve, which is biased, preferably by spring means, to a closed position.

The licking plate which may consist of a tray having a lip, is preferably mounted for pivotal movements and by arranging it at an angle to the horizontal, liquid being discharged on to the tray at its rear end, liquid will collect on the front and lower end so that the animal soon learns to use it as a licking plate.

In one such arrangement in which delivery of liquid is by gravity, a single valve is provided for controlling the release of liquid from a housing connected to the reservoir and having an outlet discharging on to the tray, closing movement of the valve being directly under control of the tray.

In order to effect a more accurate control of the amount of liquid which is dispensed there may be provided a double poppet valve, the rise and fall of the valve being controlled by a spring and so arranged that when the valve is in its upper position liquid will flow into a cavity within the valve housing, at which time the cavity remains closed by the lowermost valve so that when the valve returns to its normal or lower position, the liquid is released into the cavity and flows on to the tray.

In a further embodiment of the invention movement of the licking plate may be utilised to operate a pump device for withdrawing liquid from a reservoir remote from the container. In one such arrangement the connection between the reservoir and a discharge orifice in the end of the supply pipe comprises a tubular section formed of flexible material, means under the control of the licking plate being provided for alternately compressing and releasing the flexible portion of the tube at opposite ends of which section are provided non-return valves.

The invention is diagrammatically illustrated in the accompanying drawings in which:

FIG. 2 is a vertical section of a drinking appliance in accordance with another embodiment of the invention;

FIG. 3 is a vertical section of a feeding and/or drinking appliance in accordance with a preferred embodiment of the invention;

FIG. 4 is a vertical section of a preferred form of the animal feeder shown in FIG. 3;

FIGS. 5 and 6 are transverse sections on the lines V—V, VI—VI of FIG. 4.

FIG. 7 is an elevation of a pipe-mounted animal feeder incorporating the feeding appliance shown in FIGS. 3 and 4.

FIG. 8 is a side view of the feeder of FIG. 7.

Figure 1:
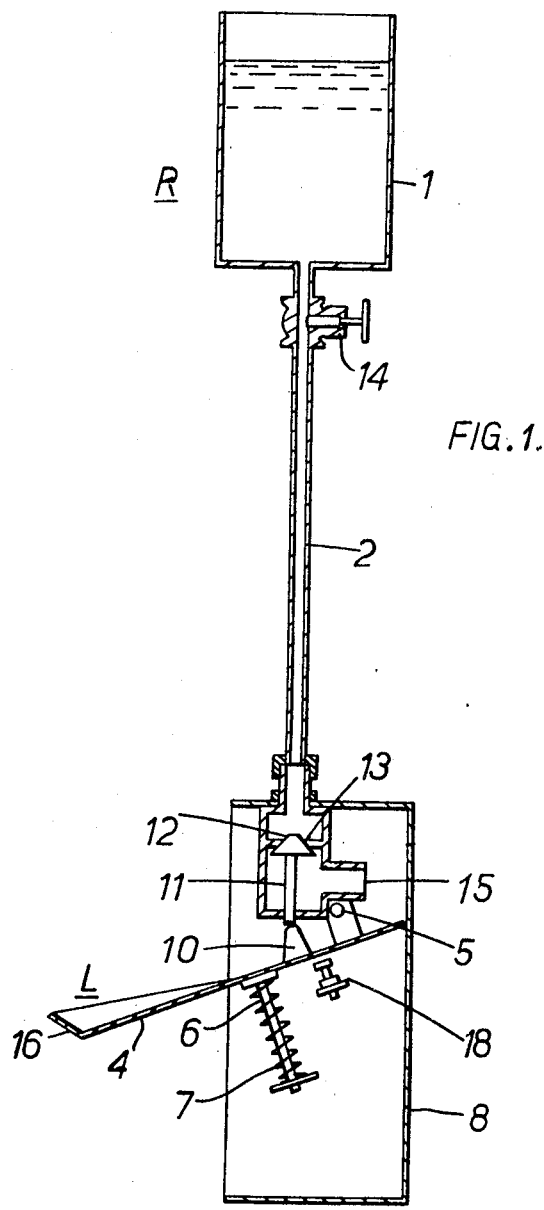
FIG. 1 is a sectional elevation of a mechanical drinking appliance in accordance with one embodiment of the invention.

In the drawings R indicates generally a tank or reservoir in which the liquid feed is contained and from which it is supplied to the feeding appliance which incorporates a licking plate indicated generally at L.

Referring to FIG. 1, the reservoir R comprises an open top container 1 connected through a pipe 2 to a valve housing 3 enclosed within a casing 8. Arranged beneath the housing 3 is a licking plate 4, the plate 4 being pivotally mounted for limited rocking movements about a horizontal axis provided by a pivot 5 at the back of the housing.

The normal position of the plate in this embodiment is determined by the valve which acts as a stop to resist the upward thrust exerted by a plunger 6 under control of a compression spring 7, one end of which engages a stop, which may be adjustably carried by casing 8 and its other end engaging the underside of the plunger head. On the upper side of the plate 4 is a lug 10 which engages one end of a valve stem 11, the valve 12 proper normally being seated against a valve orifice 13 within the valve housing, so that when, as in the position shown, the valve is closed, liquid feed in the container 1 cannot pass beyond the valve and into the chamber 14.

However, when a cow or other animal touches, e.g. by licking, the plate 4 the plate will be depressed against the action of the spring plunger 6 whereupon the lug 10 will be withdrawn allowing the valve to fall by gravity when liquid will flow into the chamber 14 and thence through an outlet 15 to discharge onto the back of the plate. This liquid runs down to the front end of the plate where it collects in a well provided by an edge flange 16.

18 indicates an adjustable stop screw by which the amount of flow through the valve may be regulated and 14 is a cut-off valve so that the unit, including the valve 13, may be isolated, e.g. in icy conditions.

In the arrangement shown in FIG. 2 the control valve incorporates a double poppet valve and the valve housing comprises an axially extending chamber 20, at each end of which is a valve seating to receive valve heads 21, 22 respectively formed on the valve spindle, the valve being urged to its closed or normal position by spring 23 in which the valve 21 cuts off the supply of liquid from the container 1, flow from which is by gravity past the valve as in the FIG. 1 arrangement.

The licking plate 4 is so positioned that when an animal nudges its flanged end, its other end will move upwardly to open the valve 21 to allow liquid to flow into chamber 20 so that when the valve 21 returns to its closed position liquid admitted to the chamber 20 will flow past the valve 22 and on to the tray like portion of the plate 4.

In the arrangements described in FIGS. 1 and 2, liquid is supplied by gravity from the reservoir under the control of a simple valve. However in cases where a gravity supply is not feasible it is necessary to utilize the displacement of the plate 4 by the animal to operate a liquid pump to draw liquid from a reservoir or e.g. a piped supply line.

An arrangement incorporating a pump is shown in FIG. 3 in which a flexible tube 25 is connected at each end to valve blocks 26, 27 each incorporating a ball valve 26′, 27′ which blocks conveniently, as shown, are secured at the corners of the casing. Each valve block comprises spigotted ends, the two inner ends 28 providing a mounting for the tube 25 and in the case of the lower block the other spigot is connected by a length of pipe to a reservoir 29. The licking plate 4 actuates a lever arm 30 which may be fixed on or adjustably secured to a spindle providing a fulcrum for the licking plate 4, the lower end of the arm havnig a boss 31 for cooperation with a similar boss 32 on the wall of the casing and between which bosses the tube 25 is compressed on actuation of the plate. It will be obvious that alternate pressure and release of pressure on the tube 25 with the aid of the non-return valves 26′ and 27′ will cause a pumping action and thereby draw liquid from the container 29. Assuming, therefore, that on the last stroke the pipe 25 has been filled the next stroke will force liquid past the valve 27′ and out through an orifice or passage in the spigotted end indicated at 33 whence it will drop on to the licking plate 4. 34 is an adjustable stop screw by which movement of the plate and thus the amount delivered per stroke may be varied.

It will be appreciated that while we have described and illustrated a flexible tube, other forms of flexible chamber or a chamber having one wall which is flexible or formed as a membrane will operate as satisfactorily and the term "flexible tube or chamber type" is to be read as including such arrangements.

In the preferred embodiment shown in FIGS. 4–6 the liquid pump valve mechanism is totally enclosed which has the advantage that freezing up in winter can be reduced to a minimum. In the arrangement shown the parts are mounted in the interior of the reservoir itself. It should be understood, however, that the container may be remotely fitted and the pump and valve mechanism separately housed.

For this purpose a U-shaped bracket or strap 35 is secured to the upper wall of a tank 36, the bracket supporting a fulcrum pin 37. The pump comprises valve blocks 38, 39, the two blocks being carried in a channel section cage 40, the cage 40 being mounted for rocking movements on the pin 37. Pin 37 also serves as a means of locating the front block 38 in which is an arcuate groove or grooves to receive the pin. The rear block 39 comprises a valve chamber 41 access to which is through a threaded inspection cap 42, block 39 being located in cage 40 by means of a bored spigot 42′. Secured in the bore of the spigot is the upper end of a pipe 43, connecting at its other end with a filter 44. To permit of adjustments pipe 43 may include two telescopic components.

At its discharge end the pump is connected through a bend 46 with a section of pipe 47 integral with and opening into the licking plate through a central orifice 47′, the plate in this embodiment being circular and having an annular depression 48. On the underside of the plate is fixing means e.g. a collar 51, by which the plate is releasably connected through a set screw to an upstanding collar 52 on the case 40, collar 52 projecting through an aperture 53 in the top wall of the reservoir. In place of a set screw a spring U-clip 52′ may be used for releasably securing the licking plate to the collar 52.

The cage 40, including the pump unit, is shown in its normal position in which the pump tube indicated at 25′ is fully extended and lies against an anvil in the form of a curved blade 56 attached to the underside of the reservoir wall. It will be seen that when an animal touches the licking plate it will push it downwardly in the direction of the arrow X causing the cage 40 to be rocked and thus the walls of the tube 25′ to be flexed by reason of the upward movement of the pump as a whole which will result in any liquid in the cylinder being ejected through the outlet valve 38′. When the thrust exerted by the animal is taken off the licking plate, owing both to the resiliency of the pump cylinder and gravity acting through the pipe 43 and filter 44 it will revert to the position shown at which time the outlet valve 38′ will close against its seating under the action of the spring while the inlet valve 39′ will lift off its seating and allow liquid to pass into the cylinder by the suction effect created therein as the wall expands.

Movement of the licking plate 48 is limited by engagement of the underside of the latter with the top of the reservoir and in this respect it will be seen that the licking plate is of wedge shape so that its upper face, when its underside 58 makes contact with the reservoir, this position being shown in dotted lines, will be at a slight angle to the horizontal with the result that liquid that issues through the orifice 47′ will run downwardly to the front of the plate 48.

Referring now to FIGS. 7–8, there is shown an attachment by which the feeding appliance can be clamped to supply pipe. It wil be appreciated that in a milking parlour or cowhouse having a number of milking stalls it may be necessary to feed a measured quantity of liquid vitamin to each animal and consequently this can be done by means of a pipe supply connected to a reservoir, the pipe P extending along the length of the cowhouse or parlour through each stall. In FIGS. 7 and 8 this attachment takes the form of a bracket having two inverted L-shaped arms 60, 60′. The two bracket arms are interconnected by means of a cross bar 62 each bar having a threaded bore to receive a set screw 63 by which the bracket can be accommodated to fit pipe sizes of varying diameter. The bracket arms are respectively provided with lugs 61 receiving further set screws 63 engageable with the pipe P. The vertical limb 65 of each bracket arm 60, 60′ is formed with an extension 66, the two extensions being united at their lower ends by a cross bar 67, in which is a fitting 68 for attachment to a nipple 70 welded in position in a hole in the wall of the pipe. The underside of the cross bar 67 is drilled and tapped to receive a fitting 71 attached to the end of a flexible supply pipe 72 whose other end has a fitting 73 for connection to the inlet valve block 42 of the pump of FIG. 4. It will be seen that by using different sizes of adjusting screws the brackets can be fitted to supply pipes up to a maximum of e.g. 6″ diameter.

What is claimed is:
1. A feeding and/or drinking appliance for livestock comprising a support bracket, a licking plate attached to the bracket and having limited displacement when engaged by an animal, a pump unit carried by the bracket, said unit including an inlet and outlet, the inlet being adapted for connection to a source of supply of foodstuff and the outlet being positioned to discharge material on to the locking plate for consumption by the animal, and means interconnecting the licking plate and the pump whereby on displacement of the plate the pump is actuated to discharge material on to the licking plate.

2. An applicance as claimed in claim 1 in which the licking plate is mounted for pivotal movements about a horizontal fulcrum on the bracket and means by which the plate is constrained to assume a position inclined to the horizontal, the discharge outlet for the foodstuff being so positioned in relation to the plate that foodstuff when released will fall thereon at or adjacent an upper or elevated end.

3. An appliance as claimed in claim 2 in which the pump is of the flexible chamber type and the means connecting the licking plate to the pump comprises a member for applying pressure to the chamber in order to flex the same and effect a working stroke of the pump.

4. An appliance as claimed in claim 2 in which the pump comprises first and second valve blocks housing an inlet and outlet valve respectively, the blocks being connected by a tube of flexible material and a lever actuated by the licking plate is provided for flexing the pump tube against an anvil.

5. An appliance as claimed in claim 3 and comprising adjustable stop means for limiting angular displacement of the pump.

6. A feeding and/or drinking appliance for livestock comprising a support bracket, a licking plate mounted for limited displacement by an animal, a pump unit, said unit including first and second valve blocks housing an inlet and outlet valve respectively, said blocks being attached to the bracket and spaced apart, each block having an inlet and outlet, the inlet of the first block being adapted for connection to a source of supply of foodstuff and the outlet of the second block being connected to a passage which discharges onto the licking plate, a tube of flexible material connecting the outlet of the first block to the inlet of the second block, and means actuated by the licking plate for applying pressure to the tube whereby on displacement of the plate the latter is flexed to effect a working stroke of the pump unit.

7. The appliance claimed in claim 6 and comprising a reservoir for the foodstuff in which the pump unit is housed within the reservoir, the pump unit being supported for pivotal movements and the licking plate being accessible from outside the reservoir.

8. An appliance as claimed in claim 7 in which the licking late is directly attached to the pump unit for actuating the same.

9. An appliance as claimed in claim 6 wherein the support bracket is provided with fulcrum pins and provides in conjunction with a fixing bracket means for permitting pivotal movements of the bracket and the pump unit, the licking plate being attached to the support bracket so that on displacement of said plate by an animal movement is transmitted to the pump unit.

10. An animal feed unit comprising a container providing a reservoir for foodstuff and means for mounting the animal feeding appliance claimed in claim 9 within the container said means including a strap in which are bearings to receive said fulcrum pins, said container having a wall opening and in which the discharge outlet comprises an extension pipe projecting through the opening, the licking plate being attached to the extension pipe.

11. An appliance as claimed in claim 6 wherein the support bracket comprises a clamp device said device having spaced arms adapted to embrace a supply line for foodstuff, each arm having a clamping screw for engagement with the supply line and means associated with the arms for tapping into the pipeline.

12. An appliance as claimed in claim 11 in which the clamp device comprises a pair of spaced arms, each arm including two limbs in which are carried the clamp screws, and between two of which limbs the support bracket for the pump unit is pivotally suspended for cooperation with an anvil.

13. An appliance as claimed in claim 6 in which the licking plate comprises a plate having a central or substantially central discharge orifice surrounded by an annular depression to receive the liquid.

References Cited
UNITED STATES PATENTS

| | | | |
|---|---|---|---|
| 561,453 | 6/1896 | Thayer | 119—75 |
| 623,545 | 4/1899 | Hufnagel | 119—75 |
| 2,319,928 | 5/1943 | Hart | 119—75 |
| 2,905,143 | 9/1959 | Atchley | 119—71 |
| 3,318,257 | 5/1957 | Niemoller | 119—75 X |
| 3,326,187 | 6/1957 | Van Gilst et al. | 119—75 |
| 3,376,856 | 4/1968 | Crippen | 119—52 |

ALDRICH F. MEDBERY, Primary Examiner

U.S. Cl. X.R.

119—72.5